Jan. 8, 1963  A. N. SZWARGULSKI ETAL  3,072,260
FUEL FILTER
Filed July 2, 1958  2 Sheets-Sheet 1
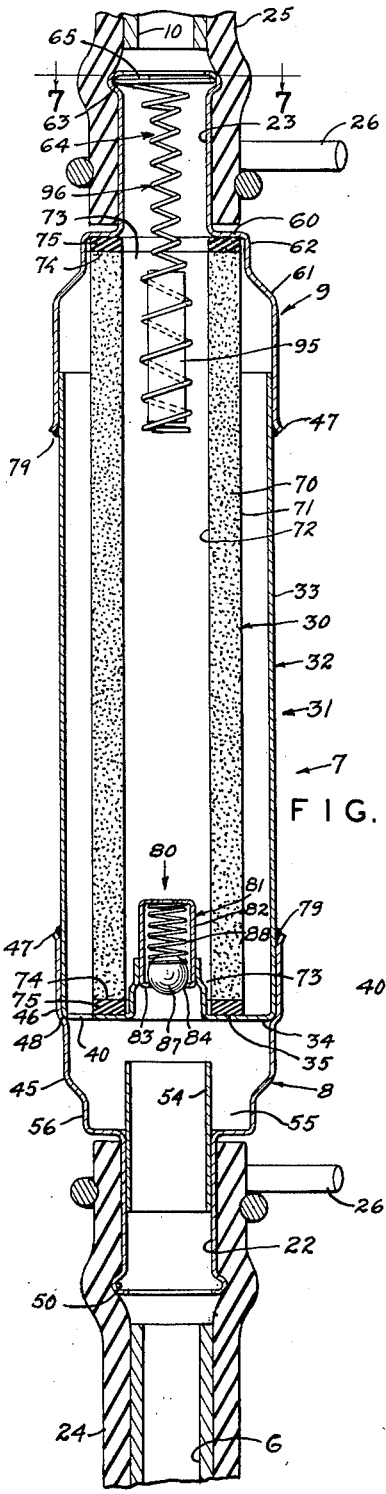
FIG. 2.
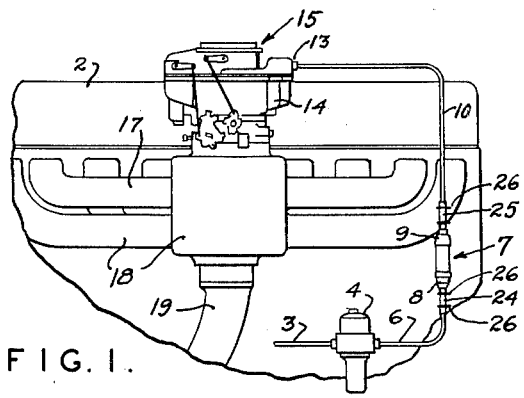
FIG. I.
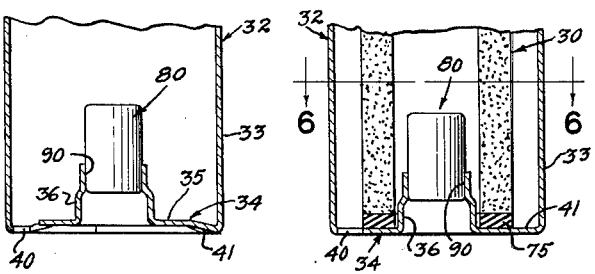
FIG. 3.
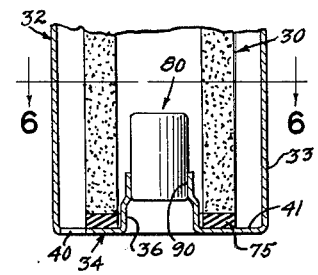
FIG. 5.
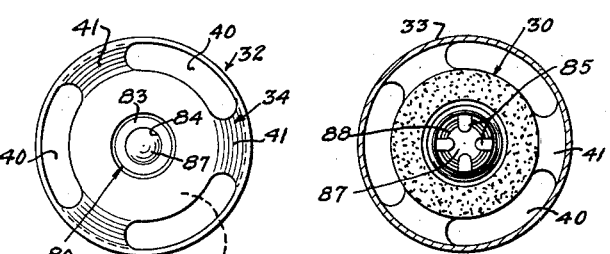
FIG. 4
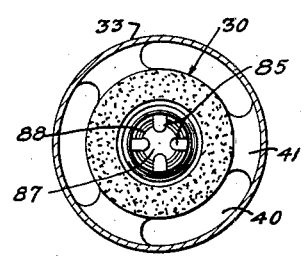
FIG. 6.
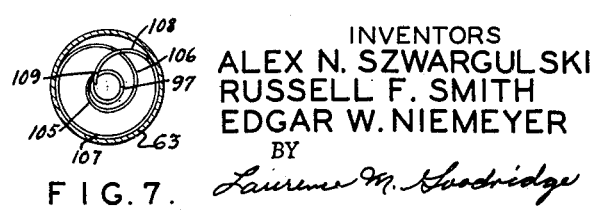
FIG. 7.
INVENTORS
ALEX N. SZWARGULSKI
RUSSELL F. SMITH
EDGAR W. NIEMEYER
BY
Laurence M. Goodridge
ATTORNEY Jan. 8, 1963  A. N. SZWARGULSKI ETAL  3,072,260
FUEL FILTER
Filed July 2, 1958  2 Sheets-Sheet 2

INVENTORS
ALEX N. SZWARGULSKI
RUSSELL F. SMITH
EDGAR W. NIEMEYER
BY
*Laurence M. Goodridge*
ATTORNEY United States Patent Office 3,072,260
Patented Jan. 8, 1963

3,072,260
FUEL FILTER
Alex N. Szwargulski, St. Louis, Russell F. Smith, Ferguson, and Edgar W. Niemeyer, Normandy, Mo., assignors to ACF Industries, Incorporated, New York, N.Y., a corporation of New Jersey
Filed July 2, 1958, Ser. No. 746,228
1 Claim. (Cl. 210—223)

This invention relates to improvements in filters, and more particularly to improvements in filters for internal combustion engines confined within cramped engine compartments.

Although the filter of this invention is especially suitable for use in the fuel system of current production automobiles, many features of the filter are obviously applicable for use in other fields. For purposes of description and illustration only, the filter is applied to an automobile fuel system and includes various features and materials particularly suitable for use in such an environment, but it is to be clearly understood that the invention may obviously be used in refrigeration systems, lubrication systems and the like.

The recent trend in automobile design has been to reduce the height of cars, increase the size of engines and to add auxiliary engine equipment within the engine compartment, thereby creating a crowded underhood condition. Because of the limited available underhood space, it is desirable, if not absolutely necessary, to reduce the size of certain devices on and around the engine, such as auxiliary engine equipment and automobile accessories generally, in order to conserve engine compartment space. Therefore, it is a primary requirement that an automobile fuel filter be as small as possible, and preferably be of a configuration which conforms to available engine compartment space.

Second, for a filter to be practical for use in modern day automobiles, in addition to being of small size, it must be sufficiently rugged to stand abuses such as rough handling during installation and subsequent servicing of the engine, as well as severe operating conditions, such as, heat, or being rapidly chilled, when hot, as by being doused with cold water which may enter the engine compartment, or by being hit with flying objects such as rocks which may enter the engine compartment.

Third, an automobile fuel filter must also be inexpensive so that it can be readily purchased by the general mass of private automobile owners. Fourth, a suitable filter for automotive use should also be easy to install in the fuel system without requiring the use of special tools or skilled techniques.

Fifth, the filter must adequate filter fuel for an appreciable period of time, for the average motorist would be reluctant to accept the inconvenience of regularly replacing a fuel filter, irrespective of the short term protection which could be realized from its use.

Public acceptance, of course, is a vital consideration in the development of automobile fuel filters. It is therefore necessary that, in addition to being inexpensive, and doing an effective job of filtering the fuel, sixth, upon eventual clogging of the filter the engine must continue to operate so as not to unduly inconvenience the motorist. Seventh, at the same time, the motorist should be warned that the filter is clogged so that it may be promptly replaced.

And, eighth, for optimum engine protection, magnetic particles should be removed from the fuel. In many automobile fuel filters, the effectiveness of the elimination of magnetic particles from the fuel has not been as complete as might be desirable, but at the same time, complete elimination of magnetic particles would be likely to cause these filters to clog prematurely.

It is therefore an object of this invention to provide an improved filter. Another object of this invention is to provide an improved automobile fuel filter for use by the average motorist. A further object of this invention is to provide a filter small enough to be inserted into the fuel supply line of an engine within a crowded engine compartment. Another object of this invention is to provide an improved filter of compact, inexpensive and rugged construction. Another object of the invention is to provide a more rugged filter, and including a filtering element resiliently mounted within the filter.

A further object of this invention is to provide an improved filter which will appear to and be within the purchasing means of the average motorist. Another object of the invention is to provide a relatively inexpensive fuel filter which may be economically replaced after a predetermined period of service.

Still another object of this invention is to provide a fuel filter for modern automobiles which may easily be installed in a fuel line.

Another object of the invention is to provide an automotive fuel filter having a sediment chamber for collecting particles filtered from the fuel to retard clogging of the filter element. Another object of this invention is to provide a fuel filter which will remain effective for an appreciable period of time and which, upon becoming clogged, will continue to provide the engine with some fuel. Another object of this invention is to provide a fuel filter which, upon becoming clogged, will continue to provide the engine with some fuel and will warn the operator that the filter is clogged.

Another object of the invention is to provide a filter incorporating an improved magnet device for removing magnetizable particles from the fuel. Another object of the invention is to provide a filter incorporating an improved magnet device for removing magnetizable particles from the fuel wherein the magnet may be easily removed from and emplaced in, the assembled filter.

Additional objects and advantages of the invention will be apparent from the following description and drawing in which:

FIG. 1 is a fragmentary elevation view illustrating the filter of this invention as applied to an engine.

FIG. 2 is an enlarged longitudinal sectional view of an embodiment of the filter illustrated in FIG. 1.

FIG. 3 is a longitudinal sectional view similar to a portion of the filter shown in FIG. 1, but prior to installation therein of a filtering element.

FIG. 4 is a bottom view of FIG. 3.

FIG. 5 is a longitudinal sectional view of a portion of the filter shown in FIG. 2, and is similar to FIG. 3, but shows the position of the parts with a filter element operatively emplaced in the filter.

FIG. 6 is a sectional view taken on the line 6—6 in FIG. 5.

FIG. 7 is a sectional view taken in the plane of the line 7—7 in FIG. 2, with parts removed.

Figure 9:
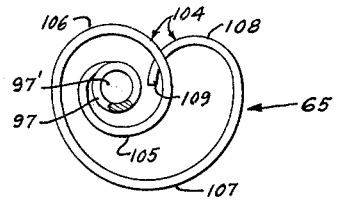
Figure 8:
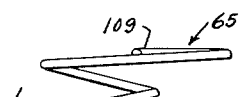
FIG. 8 is an enlarged longitudinal view of a magnet retainer as illustrated in FIG. 2, but removed from the filter, and with the magnet shown in phantom lines.
Figure 10:
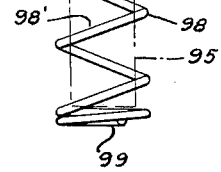

FIGS. 9 and 10 are sectional views taken on the lines 9—9 and 10—10, respectively, in FIG. 8.

Figure 11:
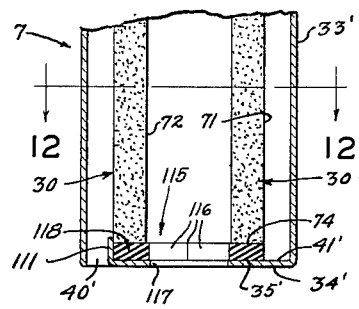

FIG. 11 is a longitudinal sectional view of a portion of another embodiment of a filter and is similar to FIG. 5.

Figure 12:
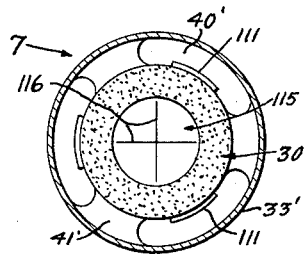

FIG. 12 is a sectional view taken on the line 12—12 in FIG. 11.

Referring to the drawings, and more particularly to FIG. 1, a fuel system for an internal combustion engine 2 is shown as comprising a conduit 3 leading from a source of fuel, such as a fuel tank (not shown), to the inlet side of a fuel pump 4. A conduit 6 leads from the outlet side of the fuel pump 4 to the inlet section 8 of a fuel filter 7.

Another conduit 10 leads from the outlet section 9 of the filter 7 to the inlet 13 of a constant level float bowl 14 of a conventional downdraft carburetor 15 mounted on the intake manifold 17 of the engine 2. The engine is also provided with a conventional exhaust manifold 18 and exhaust pipe 19. The inlet section 8 and the outlet section 9 of the filter 7 are provided with nozzles 22 and 23 (FIG. 2) which are connected to the fuel lines 6 and 10, respectively, by rubber tubing 24 and 25, respectively, secured in a conventional manner by hose clamps as 26.

FIG. 2 shows the filter 7 to a much enlarged scale over that of FIG. 1. The actual dimensions of a typical filter are approximately 4⅝ inches long and ⅞ of an inch at the widest diameter, providing a filter of a size and configuration especially suited for installation in a fuel line under cramped conditions.

The embodiment of the filter 7 illustrated in FIGS. 2-7 comprise a tubular ceramic filter element 30 mounted within a housing indicated generally as 31. The housing 31 comprises an elongated generally cup shaped body section 32 having a tubular side wall 33 and a base or end wall 34 providing an annular seat 35 for one end of the filter element 30. A boss 36 is formed in the end wall 34 and projects inwardly from the inner periphery of the seat 35, providing a guide received within the hollow of the filter element 30, for centering the filter element on the seat during and after assembly of the filter. A plurality of circumferentially spaced, elongated, arcuate slots 40 are formed in the end wall 34 between the outer periphery of the annular seat 35 and the side wall 33. The end wall 34 is resilient and the arcuate slots 40 define therebetween resilient bridge portions 41 which yieldingly resist axial movement of the seat 35 toward the inlet nozzle 22.

The inlet section 8 comprises the nozzle 22 which is provided with a skirt 45 having a portion 46 in snug telescopic or nested engagement with the side wall 33. The portion 46 of the skirt 45 has an outwardly flared rim 47 to receive solder, or the like, forming a permanent leakproof assembly of the inlet section 8 and the tubular body section 32. The outer end of the nozzle 22 is formed with an outwardly projecting circumferential protrusion 50 defining an internal groove, and facilitating a tighter connection between the rubber tube 24 and the nozzle 22. The hose clamp 26 forms a tight leak-proof joint between the rubber tube and the nozzle. The skirt 45 has a stop shoulder 48 which engages the adjacent end of the tubular body 32 to limit the nested engagement of the inlet section 8 and the body 32. A pipe 54 is press fitted into the nozzle 22. The pipe 54 and the skirt 45 define together a sediment chamber or sump 55 for receiving and holding foreign matter removed from the fuel by the outer wall of the filter element 30, thereby preventing a buildup of the foreign matter along the outer wall of the filter element and accompanying clogging of the filter element. The skirt 45 has a reduced portion 56 which provides a pocket in the sump 55 tending to eliminate disturbance of the foreign matter in the sump by turbulent fuel entering through the pipe 54.

The outlet section 9 is formed with the nozzle 23 merging into the inner periphery of an annular seat 60 engaging the other end of the filter element 30. A skirt 61, formed with a reduced guide portion 62, for centering the filter element 30 during and after assembly of the filter. The skirt 61 has an outwardly flaring rim 47, as previously described, for forming a permanent leak-proof solder connection between the skirt 61 and the open end of the body 32. Skirt 61 engages body 32 with a snug telescopic or nested engagement similar to the connection between the inlet section and the body, or with a press fit. The outer end of the nozzle 23 is formed with a circumferential protrusion and recess 63 for more firmly receiving connecting rubber tube 25 and for receiving an attaching portion 65 on a magnet holder or support 64, formed of resilient wire, and to be fully described hereinafter. The body engaging portion of the skirt 61 is of constant diameter so that it may be telescoped over the open end of the side wall 33 until the filter element is tightly and resiliently supported within the housing 31.

The housing is preferably formed of brass sections which may be stamped from sheet metal, or which may be extruded. Other metals, or suitable plastic materials, may be utilized in lieu of brass. If desired, the inlet section 8 may be formed of a transparent material such as plastic, so that the level of foreign matter deposited in the sediment chamber or sump 55 may be observed.

The tubular ceramic filter element 30 includes a cylindrical ceramic side wall 70 having an outer face 71 and an inner face 72 defining a hollow having open ends 73 with flat faces or rims 74 about the open ends. Resilient sealing washers 75 are inserted between the rims 74 and the annular seats 35 and 60. In assembling the filter, the outlet section 9 is forced toward the body end wall 34 to resiliently urge the end wall from the position shown in FIGURE 3 to the position shown in FIGURE 5, or in FIGURE 2. The outlet section 9 is then permanently attached to the body 32 by solder 79. Thus the ceramic filter element 30 is resiliently seated in the filter housing 7 by the resilient sealing washer 75 and the resilient bridges 41 connecting the annular seat 35 and the body side wall 33. The filter element guides 36 and 62 should fit the filter element 30 as closely as possible but, because of allowable tolerances both in diameter and in warpage of the filter element 30, it is preferable that the guides do not tightly grip the filter element as the filter element might be cracked or chipped on the ends.

The filter 7 has a relief valve 80 which permits fuel to pass through the relief valve when the ceramic filter element 30 is clogged sufficiently to prevent the adequate flow of fuel to the carburetor. In other words, when insufficient fuel is passing through the ceramic filter element 30 to satisfy engine requirements, the relief valve opens so that some fuel will be provided to maintain the engine in operation, rather than permitting the supply of fuel to the engine to be further curtailed as the filter element clogs even more, until the engine stops. It should be noted that the reduction in engine power occurs before the relief valve opens, and continues thereafter to indicate to the operator that the filter is clogged and should be replaced. Fuel is by-passed through the relief valve directly to the engine only when the filter becomes clogged, and during normal operation of the filter all of the fuel passes through ceramic side wall 70 of the filter element 30. The relief valve comprises a generally cup shaped body 81 having a side wall 82 and a base 83 with a circular aperture 84. The open end of the cup 81 is provided with inturned ears 85. A spherical ball 87 is received in the aperture 84 and is resiliently urged into sealing engagement with the aperture wall by spring 88 compressed between the ball 87 and the ears 85. In a fuel system in which the fuel pressure runs between 3 and 5 p.s.i., the relief valve should be set to open at about 2 p.s.i. pressure differential across filter element 30. The relief valve is press fitted into a cylindrical boss 90 formed integrally on the end of guide 36.

The filter hollow and the outlet nozzle 23 form an outlet system for the filter. Mounted within the outlet system, and more particularly within the hollow of the filter, is a permanent bar magnet assembly 64. The magnet assembly 64 is detachably secured in the circumferential recess formed by protrusion 63 at the open end of the outlet nozzle 23 and includes a permanent bar magnet 95 and a magnet support in the form of a spiral spring 96. The spring 96 includes an attaching portion 65, a large spiral 98 (FIG. 8) having an eye 98' of larger diameter than that of the magnet, and freely receiving the magnet 95, and a small spiral 97 having an eye 97' of smaller diameter than the diameter of magnet 95 and retaining the magnet in the larger eye 98' coaxially aligned with the spring 96 and the filter element 30. The free end of the larger spiral 98 is provided with a stop 99 formed by extending the end of the spring radially inwardly for retaining the magnet. To insert or remove the magnet 95 from the spring holder 64, the reduced portion 97 and the enlarged portion 98 of the spiral are flexed at their juncture to form an obtuse angle and may be stretched slightly, permitting the magnet to be inserted into or removed from the eye of the enlarged portion 98. Referring particularly to FIG. 9, the attaching portion 65 of spring 96 is shown in detail in its expanded or relaxed position, which it assumes naturally when removed from the filter. The reduced portion 97 of the spiral terminates in a generally progressively expanding spiral 104. In detail, the spiral portion 104 includes a progressively expanding spiral portion 105, an arcurate portion 106 and a larger expanding spiral portion 107 terminating in a generally arcurate end 108. Referring to FIG. 7, the attaching portion 65 is shown emplaced in the circumferential recess 63 in the outlet nozzle 23. The above enumerated portions of the spiral portion 104 are shown in their relative positions when inserted in the recess 63. The magnet support is formed as a spiral spring from a single piece of resilient wire, such as music wire. By forming the holder of magnetizable wire, the enlarged spiral 98 will tend to collect some magnetic particles and generally provides additional surface for the collection of magnetizable particles in the fuel. The housing 32 is preferably substantially non-magnetic, and the spring may be a non-magnetic material, such as bronze, if desired. It should be noted that the free end 109 of the substantially arcurate portion 108 may be grasped by pliers or the like for removal or insertion of the magnet and holder into the groove 63. Also, the arcuate portion 108 provides a grip for a finger in removing or inserting the holder in the groove 63. The resilient wire from which the holder is formed should be sufficiently stiff so that the magnet will not move, or so to speak oscillate, within the ceramic filter 30, to the extent that it contacts the inner wall 72 of the filter as this might tend to crack or chip the filter. Also, the wire should be sufficiently stiff so that when the filter is in a horizontal position the magnet and holder will not rest against the ceramic filter.

FIGS. 11 and 12 illustrate another embodiment of a relief valve and sealing gasket which may be used in lieu of relief valve 80 and sealing gasket 75, illustrated in the first embodiment. In the present embodiment, a body 33' is provided with an end wall 34' having openings 40' defining resilient bridge portions 41', and an arcuate seat 35', all substantially the same as similarly numbered part in the first embodiment. The ceramic filter 30 may be identical with the ceramic filter element in the preceding embodiment. Filter centering and retaining guides are provided, as shown, and should freely receive the filter element 30. In this embodiment the combined relief valve and sealing gasket member 115 comprises a resilient disk having crossed slits 116 therethrough. The seat 35' is provided with an inner-peripheral edge 117 and guides 111 for centering the filter element 30 and member 115. As illustrated, the slits 116 terminate short of the inner wall of the hollow filter 30. The outer portion 118 serves as a resilient gasket which is compressed between the seat 35' and the filter element rim 74, in the same manner as the resilient gasket 75. The relief valve 115 should open at approximately the same pressure as the relief valve 80. The opening pressure depends on, and may be controlled by, the physical characteristics of the resilient material from which the valve and gasket 115 are formed, the thickness of the material, the length of the slits 116 and the diameter of the hole defined by peripheral wall 117.

Assembly

The filter includes but a few parts which are simple to assemble, providing an inexpensive, rugged and effective filter. In assembling the first embodiment of the filter 7, the relief valve 80 is pressure fitted into the boss 90 in body end wall 34, and the pipe 54 is press fitted into the inlet nozzle 22. A first gasket 75 is inserted over guide 36, the ceramic filter element 30 is inserted into the body 32 and an end rests on the gasket 75, a second gasket 75 is placed on the other end of the filter element 30, and the outlet section 9 is telescoped over the open end of the body 32 with a snug or press fit. The outlet section 9 and body 32 are forced together until the seat portion 35 and bridges 41 of the end wall 34 are displaced from the position shown in FIGURE 3 to the position shown in FIGURE 5 or FIGURE 2. The outlet section 9 is then permanently secured to the open end of the body 32 by solder 79. The inlet section 8, with the pipe 54 previously press fitted into the nozzle 22, is telescoped over the opposite end of body 32, and is secured thereto by a leak proof solder joint 79. Although the body 32 and the inlet section 8 may be press fitted together, since the assembled filter does not in itself act to push these members apart, a snug slip fit is normally satisfactory. Thus a rugged filter resistant to breakage, is provided. All housing joints are reinforced by tight nested engagement of adjacent parts, with solder reinforcing and stiffening the joints. The ceramic filter element is firmly and resiliently mounted within the filter housing. Also, the filter is resiliently mounted in the fuel line by the rubber tubing, tending to protect the filter from engine and car vibrations.

The magnet 95 is inserted into the resilient spiral spring holder 64 by bending the smaller spiral 97 and the larger spiral 98 at their juncture, and slipping the magnet into the eye 98' of the larger spiral 98. Upon releasing the spiral, the magnet is locked within the larger eye. The magnet 95 and spiral portion of the holder 64, which are both smaller than the outlet nozzle 23, and the hollow in the filter element 30, are inserted through the outlet nozzle and into the hollow in the filter element and are retained therein by inserting the spiral portion 104 of the holder 64 in the recess 63 at the end of the outlet nozzle. As previously described, a finger may be inserted into the arcuate portion 108 of the holder, or the end 109 may be engaged by pliers, or the like, to assist in inserting, or in removing, the attaching portion 65 in recess 63.

Installation

The filter is usually, but not necessarily, installed in the fuel line between the pump 4 and carburetor inlet 13, preferably in a vertical position. Installation is simple and requires no special brackets, tools, or techniques. The fuel line is cut to provide an opening just slightly larger than the over all length of the filter. The filter is inserted into the line in a conventional manner by means of rubber tubes 25 and hose clamps 26. One tube connecting fuel line 6 and inlet nozzle 22, and another tube connecting outlet nozzle 23 and fuel line 10. The filter should preferably be inserted in a vertical portion of a fuel line with the inlet section 8 at the bottom so that the sediment chamber or sump 55 will be located below the ceramic filter element 30. The filter may be inserted in an inclined position with the sump 55 downward without destroying the effectiveness of the sump.

Operation

The operation of the filter is as follows: Fuel is delivered to the filter 7 through fuel line 6, entering through inlet nozzle 22 and pipe 54. The fuel passes through openings 40 in end wall 34, filling the space between the outer wall 71 of the ceramic filter element 30, and the body side wall 33 and skirts 45 and 61. The fuel passes through the ceramic side wall 70 and into the filter element hollow, whereupon it flows around the magnet 95 and holder 64 and out through outlet nozzle 23 into the fuel line 10.

Much of the foreign matter in the fuel entering the filter will be removed by the ceramic filter element 30 without penetrating the side wall surface and some of this foreign matter will pass downward through the passages 40 and into the sediment chamber or sump 55, where they will be retained in pocket 56. Thus the effective life of the filter is substantially increased. As the ceramic side wall 70 begins to clog through foreign material retained on the outer surface 71 or within the wall, the fuel pressure on the inlet side of the filter element will begin to build up and less fuel will pass through the filter element to the carburetor, thus the power delivered by more powerful engines will eventually begin to fall off, alerting the operator. The relief valve, either 80 or 115, is set to open, responsive to pressure differential across the filter element 30 after the quantity of fuel passing to the engine has been sufficiently reduced to cause the engine to lose power, and when additional clogging of the filter element 30 would cause a rapid increase in the pressure drop across the element, but for the relief valve. Opening of the valve does not stop or substantially reduce the faltering of the engine, but merely permits sufficient fuel to pass to the engine so that additional clogging of the filter element 30 will not cause the engine to malfunction to the extent that it will not drive the automobile, or to stop completely. Opening of the relief valve should not cause the engine to resume normal operation. Therefore, the operator continues to be alerted to replace the filter. The magnet 95 and holder may be removed and cleaned, should the fuel contain an unusually large amount of magnetizable particles, which prolongs the life of the filter.

Although this invention has been described with particular reference to a particular environment, various features, construction details and materials, and functional relationships, various changes will be apparent to one skilled in the art, and the invention is therefore not to be limited to any particular environment, features, construction, materials or functional relationships, except as set forth in the appended claim.

What is claimed is:

A fuel filter comprising an elongated tubular body member having an inlet opening at one end and an outlet opening at the other end thereof, said outlet opening including a nozzle projection, said nozzle projection being formed with an inner annular recess, a tubular filter, means mounting the tubular filter coaxially within and spaced from the side walls of said tubular body, said mounting means including structure closing the end of said filter element adjacent to said body member inlet and closing the space between the other end of said tubular filter and said body member adjacent to said outlet opening, an elongated magnet, means supporting said magnet in said tubular filter and spaced from the walls thereof, said supporting means comprising a spiral spring formed of magnetizable metal and having an inner end portion projecting into the tubular filter, said spiral spring having its inner end portion formed with a magnet-holding portion of a diameter sufficient to freely receive therein said magnet and said spiral spring outward of said magnet-holding portion including a series of spiral turns of smaller diameter than the dimension of said magnet to provide an abutment for retaining said magnet within said spring against movement in one direction, an inwardly projecting portion formed in said spring at the other end of said magnet-holding portion to abut the inner end of said magnet and to prevent axial movement of said magnet in the other direction, the outer end of said spiral spring beyond the reduced turns terminating in an enlarged concentric annular terminal portion for reception in the annular recess of said nozzle.

References Cited in the file of this patent

UNITED STATES PATENTS

| | | |
|---|---|---|
| 328,222 | Huffman | Oct. 13, 1885 |
| 1,362,998 | Lindemann | Dec. 21, 1920 |
| 1,896,310 | Hildebrand | Feb. 7, 1933 |
| 2,201,837 | Schanck et al. | May 21, 1940 |
| 2,371,891 | Hoffmann | Mar. 20, 1945 |
| 2,427,320 | Zech | Sept. 9, 1947 |
| 2,598,818 | Muirhead | June 3, 1952 |
| 2,629,393 | Langdon | Feb. 24, 1953 |
| 2,793,752 | Jay | May 28, 1957 |
| 2,795,333 | Kennedy | June 11, 1957 |
| 2,897,835 | Philippe | Aug. 4, 1959 |

FOREIGN PATENTS

| | | |
|---|---|---|
| 271,341 | Italy | Feb. 6, 1930 |